United States Patent
Belfield

(10) Patent No.: US 7,964,333 B1
(45) Date of Patent: Jun. 21, 2011

(54) FRET-BASED TWO PHOTON THREE DIMENSIONAL OPTICAL DATA STORAGE

(75) Inventor: Kevin D Belfield, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 972 days.

(21) Appl. No.: 11/758,858

(22) Filed: Jun. 6, 2007

Related U.S. Application Data

(60) Provisional application No. 60/812,320, filed on Jun. 9, 2006.

(51) Int. Cl.
*G11B 7/24* (2006.01)

(52) U.S. Cl. .................. 430/270.13; 430/945; 428/64.8; 369/288; 369/283

(58) Field of Classification Search .................. None
See application file for complete search history.

(56) References Cited

U.S. PATENT DOCUMENTS

| | | | |
|---|---|---|---|
| 5,268,862 A | 12/1993 | Rentzepis | |
| 5,289,407 A | 2/1994 | Strickler et al. | |
| 5,399,451 A * | 3/1995 | Hashida et al. | 430/19 |
| 6,045,888 A * | 4/2000 | Chen et al. | 428/64.1 |
| 6,310,850 B1 | 10/2001 | Sochava et al. | |
| 2002/0020830 A1 * | 2/2002 | Bass et al. | 252/301.16 |
| 2003/0174560 A1 * | 9/2003 | Dahmen et al. | 365/200 |
| 2007/0147214 A1 * | 6/2007 | Erben et al. | 369/103 |
| 2008/0213625 A1 * | 9/2008 | Raymo et al. | 428/704 |

FOREIGN PATENT DOCUMENTS

| | | | |
|---|---|---|---|
| JP | 03-284743 | * | 12/1991 |
| JP | 11-149663 | * | 6/1999 |
| WO | 99/23650 | * | 5/1999 |
| WO | 00/05624 | * | 2/2000 |

OTHER PUBLICATIONS

Sun et al. "Two photon induced fluorescence of diarylethene molecule" Proc. SPIE vol. 4930 pp. 439-442 (2002).*
Medvedeva et al. "A combination of selective light reflection . . . " Macromol. Rapid. Commun. vol. 26 pp. 177-182 (2005).*

(Continued)

*Primary Examiner* — Martin J Angebranndt
(74) *Attorney, Agent, or Firm* — Brian S. Steinberger; Joyce P. Morlin; Law Offices of Brian S. Steinberger, P.A.

(57) ABSTRACT

An optical data storage system and method with non-destructive multiple readout of 3-D data stored in multiple layers uses two-photon induced fluorescence modulation. The novel system uses the photochromic properties of the open and closed form of diarylethene in the two-photon energy transfer-based read-out method of a 3-D optical data storage system, providing more than 10,000 readout cycles without significantly compromising the stored data. The system of the present invention can be recorded and read out using the same wavelength simply by changing the intensities. Also, since the incident intensity used in two-photon readout is low due to the efficient absorption of the two-photon absorbing fluorene dye, a less expensive, nanosecond laser diode can be used, making this two-photon 3-D data storage system less expensive, stable, highly responsive, and reliable. This photochromic system is capable of either write-once read many (WORM) or erasable and rewritable 3D optical data storage.

14 Claims, 21 Drawing Sheets

OTHER PUBLICATIONS

Irie et al. "The effect of additives on the radiation induced coloration . . . " Bull. Chem. Soc. Jap. vol. 75 pp. 2071-2074 (2002).*

Murase et al., Photochenically induced fluorescence control with intermolecular energy transfer from the fluorescent dye to a photochormic diarylethene in a polymer film, Macromol. vol. 36 (4) pp. 964-966 (Jan. 2003).*

Shim et al. "Ring opening dynamics of a photochormic diarylethene derivative in solution", J. Phys. Chem. A, vol. 107(40) pp. 8106-8110 (Apr. 2003).*

Fischer et al. "Fluorescence of coumarins and xanthenes after two photon absorption with pulsed titanium-sapphire laser", Appl. Opt., vol. 34(12) pp. 1989-2003 (Apr. 1995).*

Ebdon et al. "Flame retardance in some polystyrenes and poly(methyl methacrylkate)s with . . . " Polym. Degrad. Stab., vol. vol. 69 pp. 267-277 (2000).*

Chemical book website download (Aug. 2010) Coumarin 153 (2 pages).*

Elangovan et al. "Charachterization of one- and two-photon excitation fluorescence resonance energy transfer microscopy" Methods vol. 29, pp. 58-73 (2003.*

Jong-Man Kim, et al. "Photoacid-Induced Fluorescence Quenching: A New Strategy for Fluorescent Imaging in Polymer Films" Angew. Chem. Int. Ed., vol. 39, No. 10 (2000), 3 pages.

Pavel Cheben, et al., "A photopolymerizable glass with diffraction efficiency near 100% for holographic storage" Applied Physics Letters, vol. 78, No. 11, Mar. 12, 2001, pp. 1490-1492.

Kevin D. Belfield, et al., "Multiphoton-absorbing organic materials for microfabrication, emerging optical applications and non-destructive three-dimensional imaging" J. Phys. Org. Chem. 2000, 13: pp. 837-849.

Claudia C. Corredor, et al., "Two-Photon 3D Optical Data Storage via Fluorescence Modulation of an Efficient Fluorene Dye by a Photochromic Diarylethene" Advanced Materials, vol. 18 (2006), pp. 2910-2914.

Kevin D. Belfield, et al. "Two-photon photochromism of a photorefractive organic material for holographic recording" SPIE, vol. 4104 (2000) pp. 15-22.

He Tian, et al., "Recent progresses on diarylethene based photochromic switches" Chem. Soc. Rev., (2004) vol. 33, pp. 85-97.

Masahiro Irie, "Diarylethenes for Memories and Switches" Chem. Rev. (2000), vol. 100 pp. 1685-1716.

Satoshi Kawata, et al. "Three-Dimensional Optical Data Storage Using Photochromic Materials" Chem. Rev. (2000), vol. 100, pp. 1777-1788.

Luciana Giordano, et al., "Diheteroarylethenes as Thermally Stable Photoswitchable Acceptors in Photochromic Fluorescence Resonance Energy Transfer (pcFRET)" J. Am. Chem. Soc., (2002) vol. 124, pp. 7481-7489.

James H. Strickler, et al., Three-dimensional optical data storage in refractive media by two-photon point excitation, Optics Letters, vol. 16, No. 22, Nov. 15, 1991, pp. 1780-1782.

Dimitri A. Parthenopoulos, et al., "Three-Dimensional Optical Storage Memory" Dept. of Chem. University of California Irvine, downloaded from www.sciencemag.org on Jun. 4, 2007, Reports, pp. 843-845, Aug. 25, 1989.

K. D. Belfield, et al., "Methodology for the Synthesis of New Multifunctional Polymers for Photorefractive Applications" American Chemistry Society, Chapter 17 (1999) pp. 250-262.

Kevin D. Belfield, et al., "Synthesis, Characterization, and Optical Properties of New Two-Photon-Absorbing Fluorene Derivatives" Chem. Mater. (2004), vol. 16, pp. 4634-4641.

Kevin D. Belfield, et al. "Photochemical properties of (7-benzothiazol-20yl-9, 9-didecylfluoren-20yl)diphenylamine under one- and two-photon excitation" J. of Photochemistry and Photobiology A: Chemistry 162 (2004) pp. 569-574.

Teruhiro Shiono, et al., "Two-Photon Absorption Recording in Photochromic Diarylethenes Using Laser Diode for Three-Dimensional Optical Memory" Japan Society of Applied Physics, vol. 44, No. 58, (2005), pp. 3559-3563.

Kevin D. Belfield, et al., "Modified Horner-Emmons Reaction of Polymeric Phosphonates: Versatile Synthesis of Pendant Stilbene-Containing Polymers" J. of Polymer Science: Part A: Polymer Chemistry, vol. 33, (1995) pp. 1235-1242.

Mansoor Sheik-Bahae, et al., "Sensitive Measurement of Optical Nonlinearities Using a Single Beam" IEEE Journal of Quantum Electronics, vol. 26, No. 4, Apr. 1990, pp. 760-769.

* cited by examiner

Figure 1A
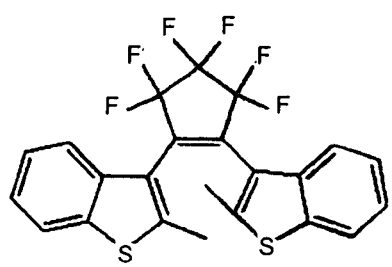
⇌ UV / Vis
Figure 1B
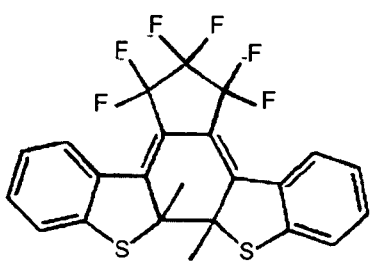
1 open form
1 closed form
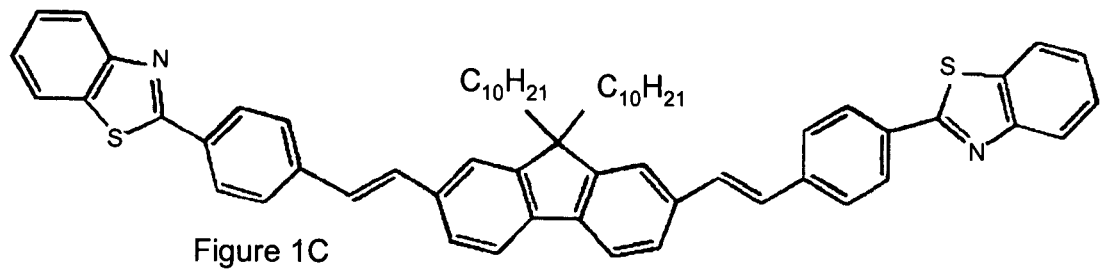
Figure 1C
2
Fig. 1

FRET-BASED TWO PHOTON THREE DIMENSIONAL OPTICAL DATA STORAGE

This invention claims the benefit of priority from U.S. Provisional Patent application 60/812,320 filed Jun. 9, 2006.

FIELD OF THE INVENTION

This invention relates to optical data storage and more particular to a novel two-photon, three-dimensional (3-D) WORM (Write Once Read Many) or erasable and rewritable optical storage system and method.

BACKGROUND OF THE INVENTION

Over the past 50 years, the field of organic photochemistry has produced a wealth of information, from reaction mechanisms to useful methodology for synthetic transformations. Many technological innovations have been realized during this time due to the exploits of this knowledge, including photoresists and lithography for the production of integrated circuits, photocharge generation for xerography, multidimensional fluorescence imaging, photodynamic therapy for cancer treatment, photoinitiated polymerization, and UV protection of plastics and humans through the development of UV absorbing compounds and sunscreens, to name a few.

The scientific basis of many of these processes continues to be utilized today, particularly in the development of organic three-dimensional optical data storage media and processes.

With the ever-pressing demand for higher storage densities, researchers are pursing a number of strategies to develop three-dimensional capabilities for optical data storage in organic-based systems. Among the various strategies reported are holographic data storage using photopolymerizable media (Cheben, P. and Calvo, M. *Appl. Phys. Lett.* 2001, 78, 1490-1492; U.S. Pat. No. 5,289,407 and U.S. Pat. No. 6,310,850), photorefractive polymers (Belfield et al. Field Responsive Polymers, *ACS Symposium Series* 726, ACS, 1999, Chapter 17 pages 250-263), and two-photon induced photochromism (Belfield et al, "Organic Photorefractives, Photoreceptors, and Nanocomposites,"*Proc. SPIE* Vol. 4104, 2000, 15-22; U.S. Pat. No. 5,268,862). It is known that fluorescent properties of certain fluorophores may be changed (quenched) upon protonation by photogeneration of acid (Kim et al, *Angew. Chem.* Int. Ed. 2000, 39, 1780-1782). Belfield et al. *J. Phys. Org. Chem.* 2000, 13, 837 has reported two-photon induced photoacid generation using onium salts and short pulsed near-IR lasers in the presence of a polymerizable medium, resulting in two-photon photoinitiated cationic polymerization. The inherent three-dimensional features associated with two-photon absorption provides an intriguing basis upon which to combine spatially-resolved, two-photon induced photoacid generation and fluorescence quenching with two-photon fluorescence imaging.

Three-dimensional (3-D) optical data storage based on two-photon processes provides a mechanism for writing and reading data with less crosstalk between multiple memory layers, due to the quadratic dependence of two-photon absorption (2PA) on the incident light intensity, as reported by D. A. Parthenopoulos, et al. in *Science*, Vol. 245, page 843 (1989) and J. H. Strickler, et al in *Opt. Letters*, Vol. 16, p. 1780 (1991). This capacity for highly confined excitation and intrinsic 3-D resolution afford immense information storage capacity (up to $10^{12}$ bits/cm$^3$) according to D. A. Parthenopoulos, et al. in *Science*, supra. Recently, the use of photochromic materials for 3-D memory has received intensive interest because of several major advantages over current optical systems, including an erasable/rewritable capability, high resolution, and high sensitivity, as reported by S. Kawata et al., in *Chem. Reviews*, Vol. 100, page 1777 (2000).

Among the several classes of photochromic materials, diarylethenes with hetrocyclic aryl groups are the most promising candidates for applications because of their excellent fatigue resistance, picosecond switching time, high photoisomerization quantum yields, and absence of thermal isomerization, as discussed by S. Tian et al. in *Chem. Soc. Rev.*, Vol. 33, page 85 (2004) and M. Irie, in *Chem. Reviews*, Vol. 100, page 1685 (2000).

Various optical systems for reading and writing 3-D memories using diarylethene derivatives as storage media have been reported by S. Kawata et al., in *Chem. Reviews*, supra wherein several methods using fluorescence readout were used to avoid destructive readout as reported by M. Irie in *Chem. Reviews*, supra.

In particular, Jares-Erijman in *J. Am. Chem. Soc.* Vol. 124, 7481-7489 (2002) and Irie in *Chem. Reviews*, supra reported using Lucifer Yellow 1 as the donor and bis(thienyl)ethane as the acceptor to build fluorescent molecules and developed a general conceptual reading/writing system based on fluorescence resonance energy transfer (FRET), where they found that the single-photon fluorescence emission of the donor is reversibly modulated by cyclical transformations of the photochromic acceptor upon irradiation of appropriate UV and visible light, respectively.

The Irie et al. system provided a novel method of using fluorescence to readout the recorded data without simultaneously erasing part of the stored information. However, the modulation of the two-photon fluorescence emission of a dye by a photochromic diarylethene has not been reported as the read-out method in a 3-D optical data storage system. This may be due, in part, to the difficulty in making suitable materials with large two-photon absorption (2PA) cross-sections, high fluorescence quantum yields, and high photostability, in which the emission spectrum properly overlaps the absorption spectrum of one of the isomers of the photochromic diarylethene.

Thus, in prior art demonstrations of two-photon 3-D optical data storage in photochromic materials, the optical storage system has traditionally failed because read out of the stored data caused some data erasing, since the photochrome itself was irradiated both in the writing step and read out step. Even in single-photon data recording with single-photon-induced fluorescence resonance energy transfer to a photochromic material, the single-photon recording and readout only allows one layer of data. This is a serious limitation on the amount of data that can be stored.

For practical applications, non-destructive read-out capability is indispensable. Appropriate read out methods such as refractive index changes, fluorescence, phosphorescence, and the like, should be selected in order to read the stored data without simultaneously erasing part of the stored information.

So, in addition to high data storage volume and fast readout, there is a need for data storage materials that are stable, highly responsive, exhibit high sensitivity and fidelity, and are less complex. In addition, the data storage and readout processes must also be more straight forward (less complex) and reliable. As mentioned above, the previously developed systems fall short in these regards.

SUMMARY OF THE INVENTION

The invention described herein relates to high density random access data storage, and is particularly directed to a novel two-photon, three-dimensional (3-D) WORM (Write Once Read Many) optical storage system, based on a combination of a diarylethene and an especially designed two-photon fluorescence dye, suitable for recording data on a thick storage medium and capable of operating as a true non-destructive readout optical storage device (see Belfield et al. *Advanced Materials* Vol. 18, 2910 (2006)).

The present invention circumvents the erasing of data during the read out of stored optical data by irradiating the photochrome for writing after converting a large portion of the short wavelength absorbing photoisomer ("open" form) to the longer wavelength absorbing photoisomer ("closed" form). Staring with a large amount of the "closed" form of photochrome is advantageous and key to the present invention. In addition, the use of near-infrared (IR), two-photon excitation allows multiple layers recording, from approximately 5 up to approximately 1000 layers with at most 5 micron thick layers of data recorded, with 5 micron thick layers spacing per layer to prevent crosstalk.

Another unique key to the present invention is the use of an efficient near-IR two photon absorbing dye.

It is an objective of the invention to develop a high density optical data storage system in which optical properties of the medium can be modulated and read in three-dimensions via two-photon processes.

Another object of the invention is to develop optical materials to enable two-photon induced photochemical changes suitable for two-photon fluorescent readout.

Another object of the invention is to harness the high photosensitivity of the photosensitive polymers to create a high density optical data storage system with multichannel readout capability to further increase data storage and readout versatility.

Another object of the invention is to develop optical materials to enable multiple read out by using fluorescence resonance energy transfer (FRET) in a photochromic polymer by use of two-photon excitation.

Another object of the invention is to develop an optical data storage system wherein data can be recorded and read out using the same wavelength.

Further objects and advantages of this invention will be apparent from the following detailed descriptions of presently preferred embodiments which are illustrated schematically in the accompanying drawings.

BRIEF DESCRIPTION OF THE FIGURES

FIG. 1A is the molecular structure of the open form of 1,2-Bis(2-methylbenzo[b]thiophen-3yl) hexafluoro cyclopentene, designated "diarylethene 1-open"

FIG. 1B is the molecular structure of the closed form of 1,2-Bis(2-methylbenzo[b]thiophen-3yl) hexafluoro cyclopentene, designated "diarylethene 1-closed"

FIG. 1C is the molecular structure of (2,7-Bis[4-(9,9-didecylfluoren-2-yl)vinyl]phenylbenzothiazole), designated "fluorene derivative 2"

DESCRIPTION OF THE PREFERRED EMBODIMENT

Figure 2:
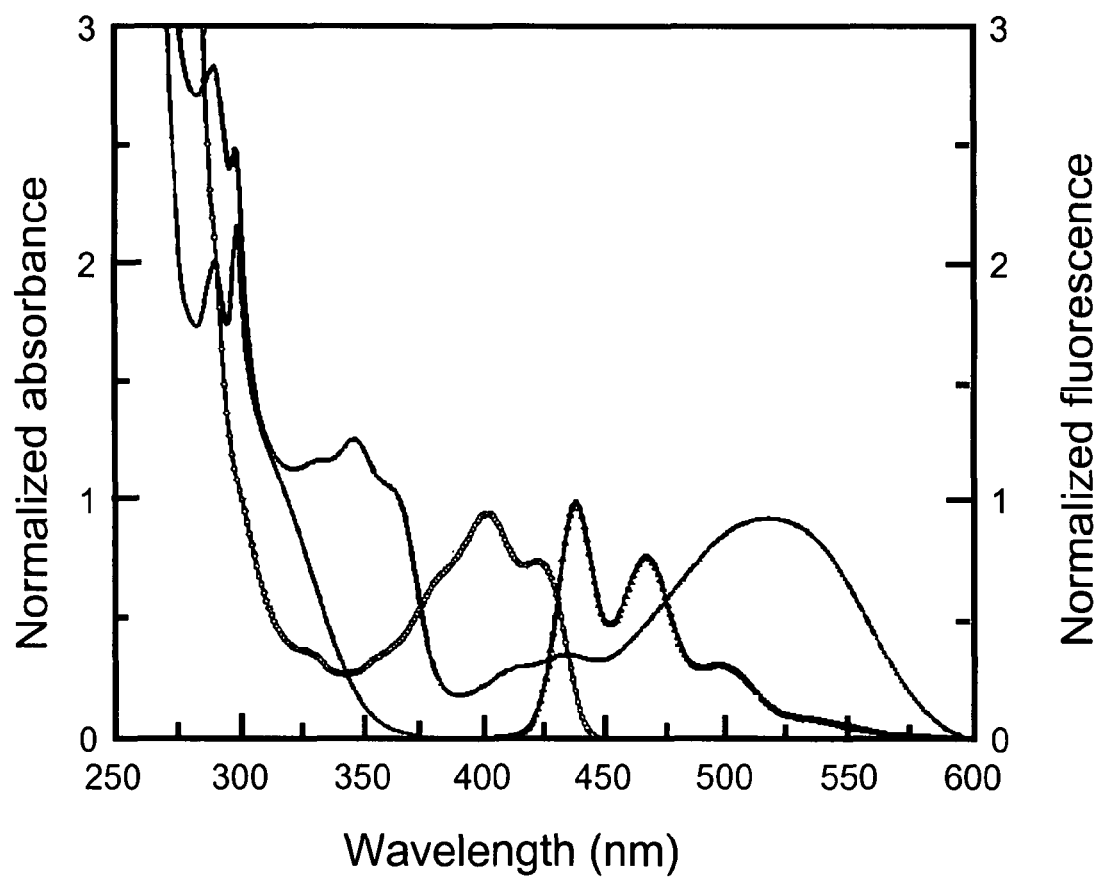
FIG. 2 shows four normalized absorbance curves, including the absorption spectra of diarylethene 1-open (1) and diarylethene 1-closed (2) irradiating at 254 nm and the absorption (3) and emission spectra of fluorene derivative 2 (4), $\lambda_{exc.}$=400 nm.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following acronyms are used in the discussion of the present invention.
2PA stands for two (2)-Photon Absorption.
FRET stands for Fluorescence Resonance Energy Transfer
WORM stands for Write Once Read Many times
When referring to the closed form of diarylethene, sometimes it is referred to as "photostationary state" of diarylethene, herein.

The present invention demonstrates a novel two-photon 3-D optical storage system based on the modulation of the fluorescence emission of a highly efficient two-photon absorbing fluorescent dye and a photochromic diarylethene.

This system is suitable for recording data in thick storage media and providing a non-destructive readout method without exhibiting any apparent fatigue, even after 10,000 readout cycles. The storage medium consists of a commercially available photochromic molecule (diarylethene 1), 1,2-bis(2-methylbenzo[b]thiophen-3-yl)hexafluorocyclopentane, shown in FIGS. 1A and 1B, and a specially designed two-photon absorbing dye (2,7-bis[4-(9,9-didecylfluoren-2-yl)vinyl] phenylbenzothiazole (fluorene derivative 2) shown in FIG. 1C.

The novel combination of the photochromic molecules in FIGS. 1A and 1B with the two-photon absorbing dye in FIG. 1C provides a superior 3-D optical data storage medium and system with recording, read-out and erasing cycles, clearly demonstrating non-destructive, erasable/rewritable characteristics.

FIG. 2 shows the absorption spectra of the open form and closed form (photostationary state) of diarylethene 1. Upon irradiation with UV light (<360 nm), a colorless solution of diarylethene 1 becomes bright red, with new absorption bands appearing at 350 and 517 nm, as shown in FIG. 2.

Diarylethene 1 is especially suitable for data storage due to its high cyclization and cycloreversion reaction quantum yields ($QY_\alpha$=0.33 at 313 nm and $QY_\alpha$=0.33 at 517 nm in hexane). Neither the open nor the closed form displays significant fluorescence (fluorescence $QY_{CF}$=0.02, $QY_{CF}$<0.02). As demonstrated by Castellano et al. in *J. Phys. Chem.* A, Vol. 108, 10619 (2004), the closed form of diarylethene 1 can be used as a photochromic energy transfer quencher of the emission of a fluorescent dye. Compared to previously reported diarylethene fluorescent switches (in which fluorescent dyes are covalently linked to the diarylethene) Jares-Erijman, in *J. Am. Chem. Soc.* supra, fluorescence modulation from non-covalently attached fluorescent dyes is a particularly intriguing approach due to the relative synthetic ease and versatility in materials selection. In the present invention, the closed form of diarylethene 1 is used to modulate the fluorescence emission of the non-covalently attached 2PA fluorene derivative 2. As shown in FIG. 2, the absorption of the closed form of diarylethene 1 overlaps the fluorescence emission of fluorene derivative 2.

In order to understand the behavior of the photochromic reaction of diarylethene 1 in the presence of the non-covalently attached fluorene derivative 2, and predict appropriate performance for further solid thin film preparations, solution studies were performed in hexane. Results showed that the photochromic reaction of diarylethene 1 was not affected by the presence of fluorene 2. No significant differences were observed in the quantum yields of cyclization ($QY_\alpha$: 0.34-0.40) and cycloreversion reactions of diarylethene 1 ($QY_\alpha$: 0.35-0.40) over a broad spectral range, in the absence/presence of fluorene derivative 2. Changes in the fluorescence emission spectra of fluorene 2 corresponded with the observed changes in the absorption spectra of diarylethene 1. Upon increasing concentration of the closed form (via 254 nm excitation), the fluorescence emission intensity of fluorene 2 decreased. A linear Stern-Volmer plot was obtained. No significant deviation from linear Stern-Volmer behavior was observed up to millimolar concentrations of the closed form of 1.

Diarylethene 1 and fluorene 2 were dispersed into poly [methylmethacrylate-co-(diethylvinylbenzylphosphonate)] (PMMA-co-VBP) to make the photochromic polymeric storage medium. This polymer was chosen due to its excellent solubility in acetonitrile and its ability to solubilize diarylethene 1 and fluorene 2 at high concentrations without aggregation. Solutions of 1 wt % of PMMA-co-VBP containing different concentrations of diarylethene 1 and fluorene 2 were irradiated with a Rayonet photoreactor (254 nm), until the photostationary state of diarylethene 1 was reached. Deep red solutions were obtained before coating. Films of approx. 40 μm were coated on glass slides using the photostationary state mixture. The contrast was controlled by changing the concentration of the photochromic compound relative to the fluorescent dye. Fluorescence modulation in the polymer film doped with 1 and 2 was demonstrated. The fluorescence from fluorene 2 was effectively quenched by the colored (closed) form of 1 dispersed in the polymer film. The switching characteristics are well controlled by changing the concentration of the photochromic compound. Films containing 22 wt % of diarylethene 1 and 1 wt % fluorene 2 (relative to the polymer) afforded the best contrast for a given exposure time and thickness.

In single-photon recording, films were placed on the stage of an inverted microscope (Olympus IX81) and irradiated through the condenser of the same microscope (N.A.=0.55). A bandpass filter (IF550, Olympus) with peak transmission at 520 nm and full width at half-maximum equal to 65 nm was placed in front of the light source (a halogen lamp). A number of different masks, including Air Force resolution targets and home made masks (FIG. 2), were used. Data are recorded by focusing the excitation light (~10 mW/cm$^2$) through one mask and then exposing the photochromic film, subsequently changing the ratio of the closed-to-open form in the irradiated areas, and, therefore, changing the refractive index. After mask removal, standard Differential Interference Contrast (brightfield) microscopy was used to readout the recorded data, where a 10× (Olympus UplantFLN 10×, N.A.=0.3) or a 20× (Olympus LUCplanFLN 20 ×, N.A.=0.45) objective lens was used.

The optimal exposure time for our storage medium under single-photon excitation was estimated by identifying the intensity profile and calculating the contract (signal-to-background ratio). For 40 μm thick films a contrast of 5.7 was achieved after 20 s exposure, while a contrast of 3.6 was obtained after 10 s exposure. Improvement of the recorded signal-to-noise ratios minimized the potential hazard of overexpressing films and compromising of resolution.

Figure 3A:
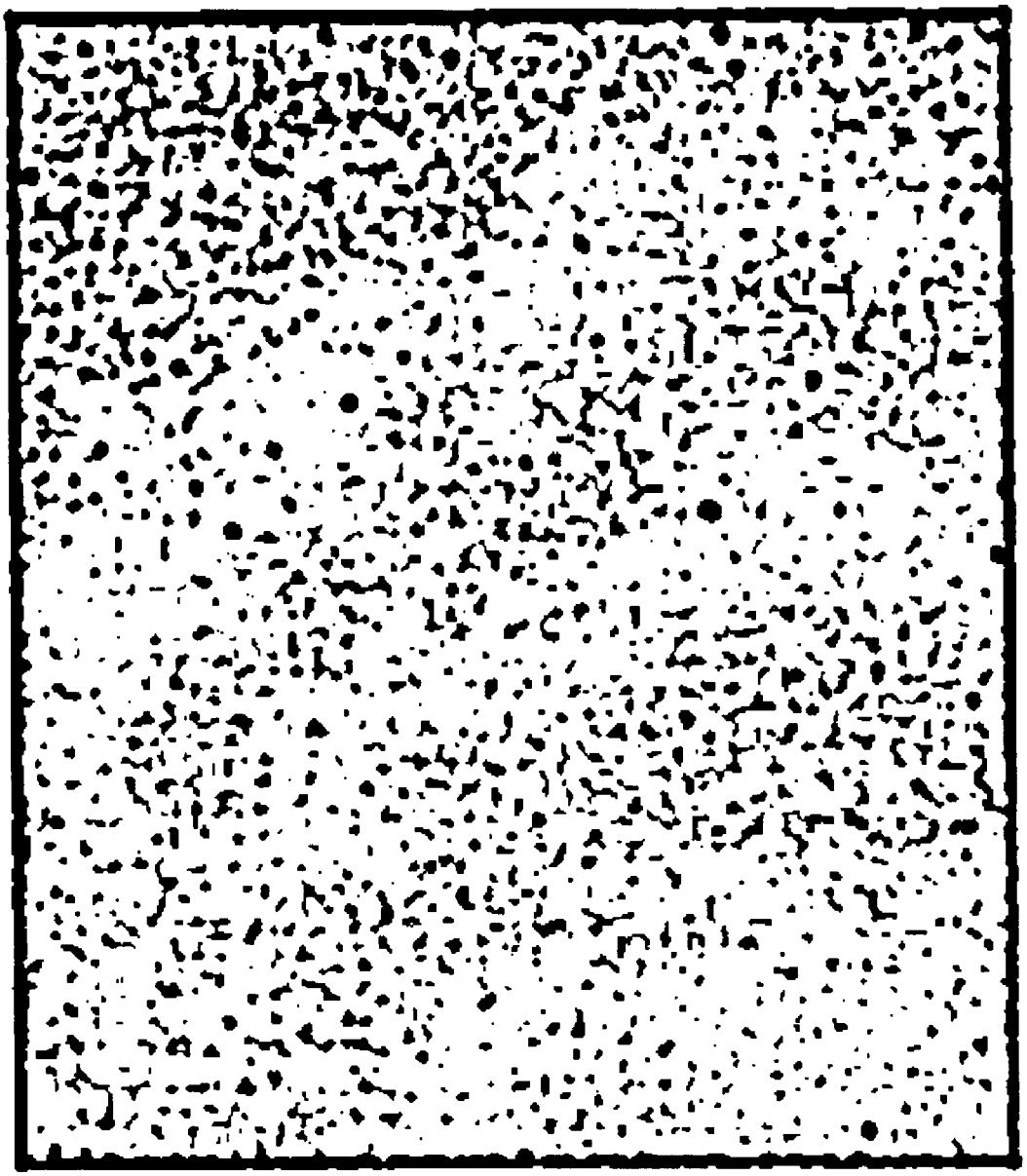
FIG. 3A is a brightfield image of storage medium before single-photon data recording wherein the scale bar corresponds to 100 µm.
Figure 3A:
Figure 3B:
FIG. 3B is a brightfield image of storage medium after single-photon data recording wherein the scale bar corresponds to 100 µm.
Figure 3B:
Figure 3C:
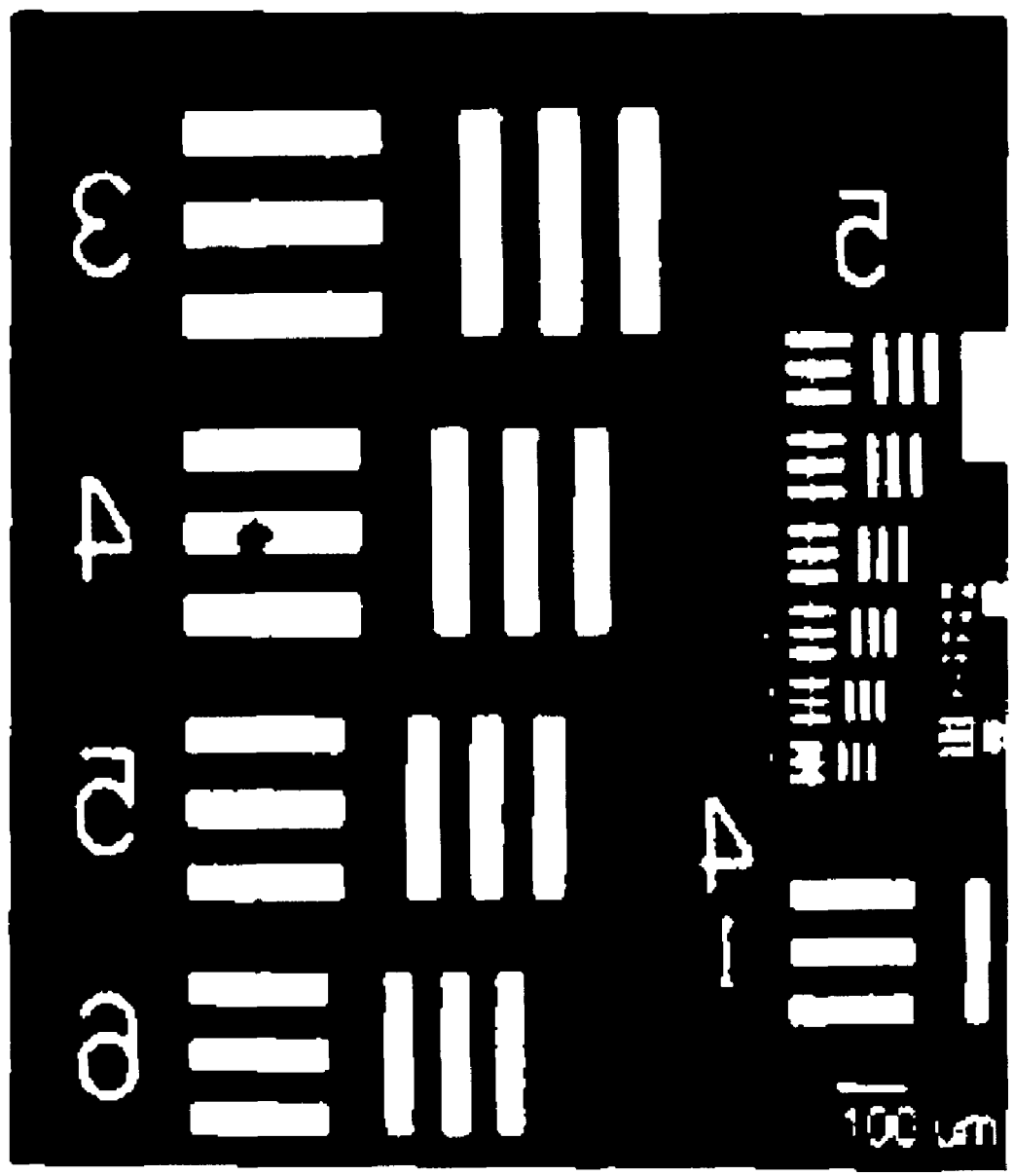
FIG. 3C is an Air Force resolution mask (data mask) wherein the scale bar corresponds to 100 µm.
Figure 3D:
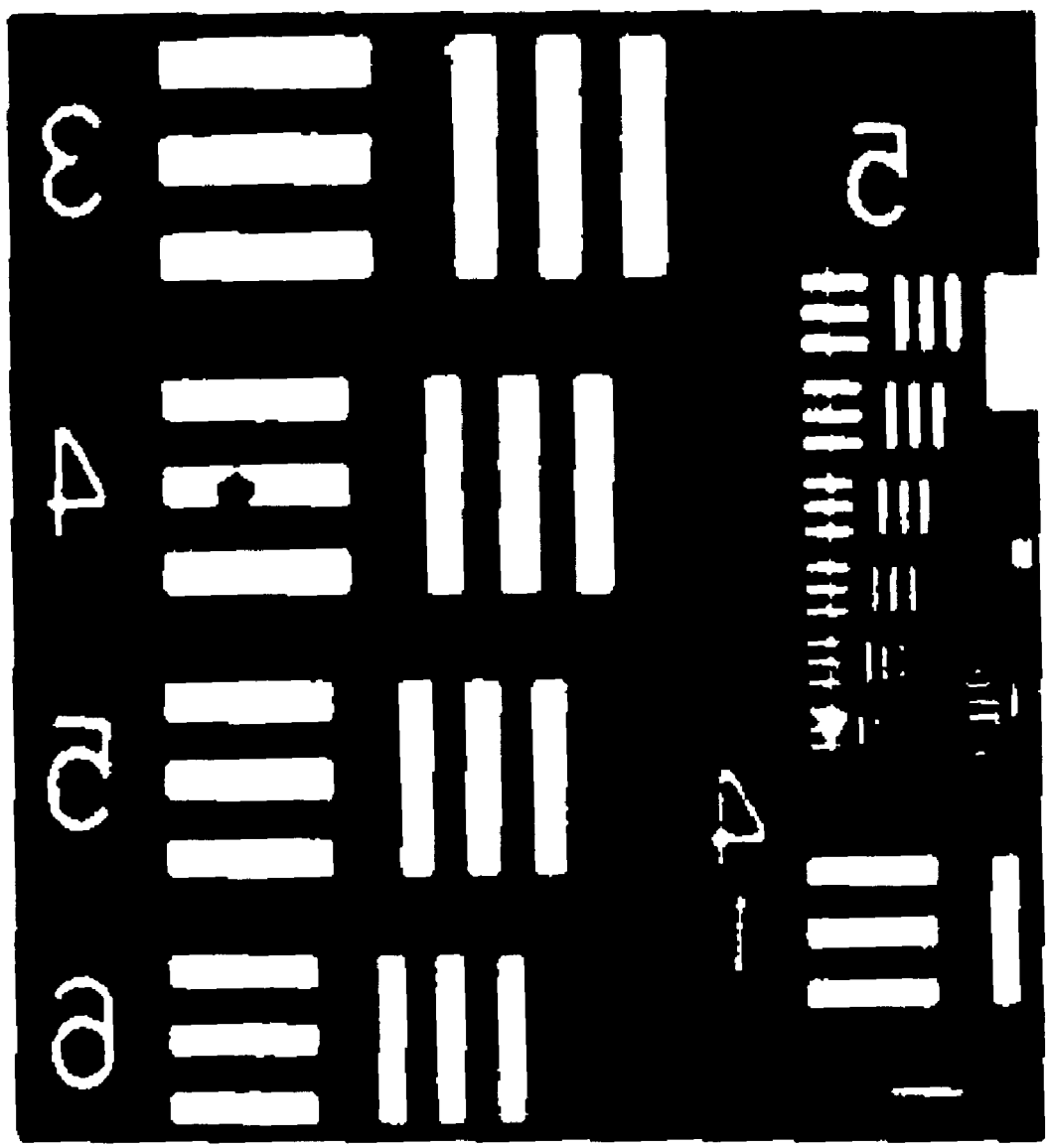
FIG. 3D is readout data using 10× objective wherein the scale bar corresponds to 100 µm.
Figure 3E:
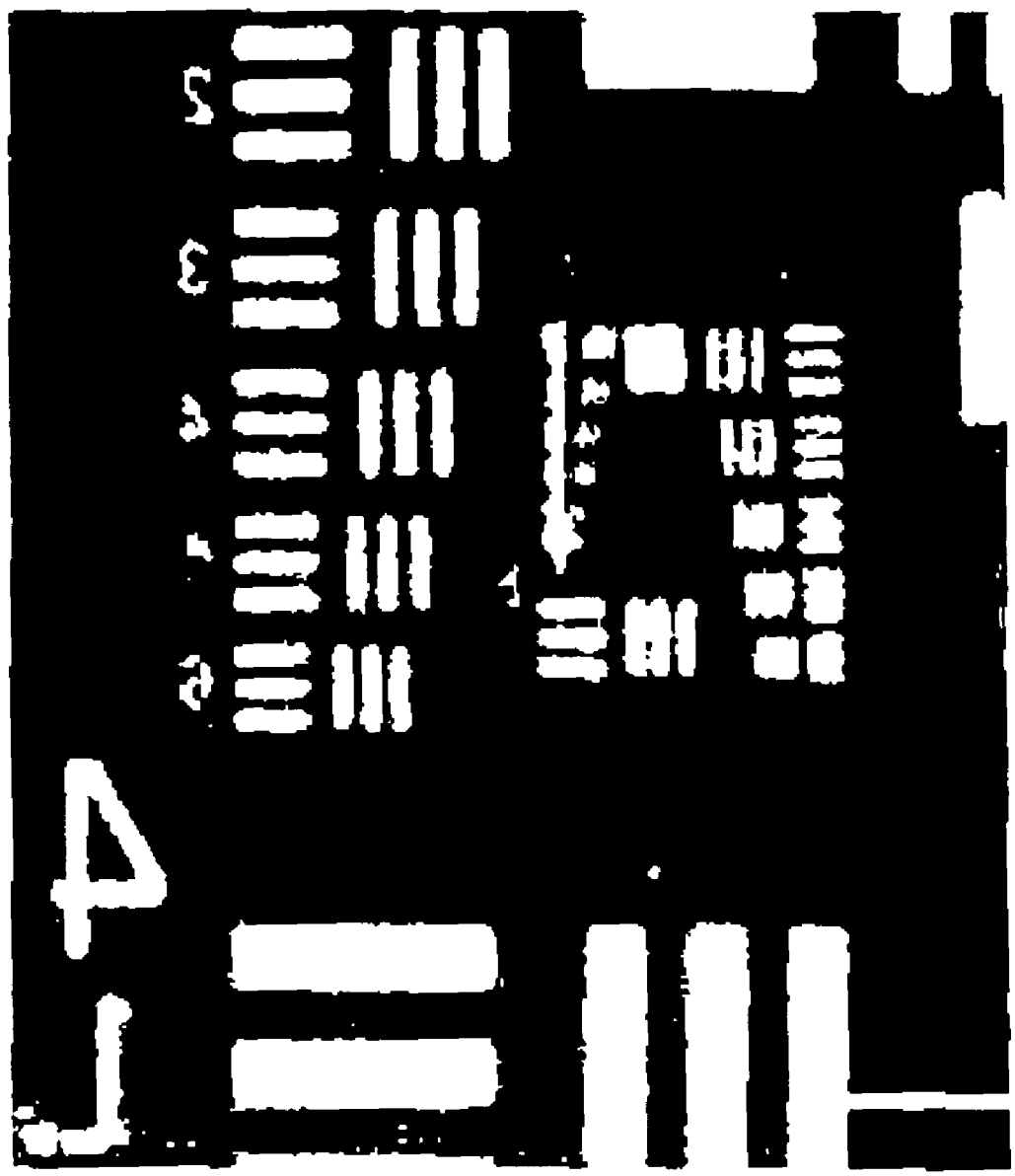
FIG. 3E is readout data using 20× objective wherein the scale bar corresponds to 100 µm.
Figure 3F:
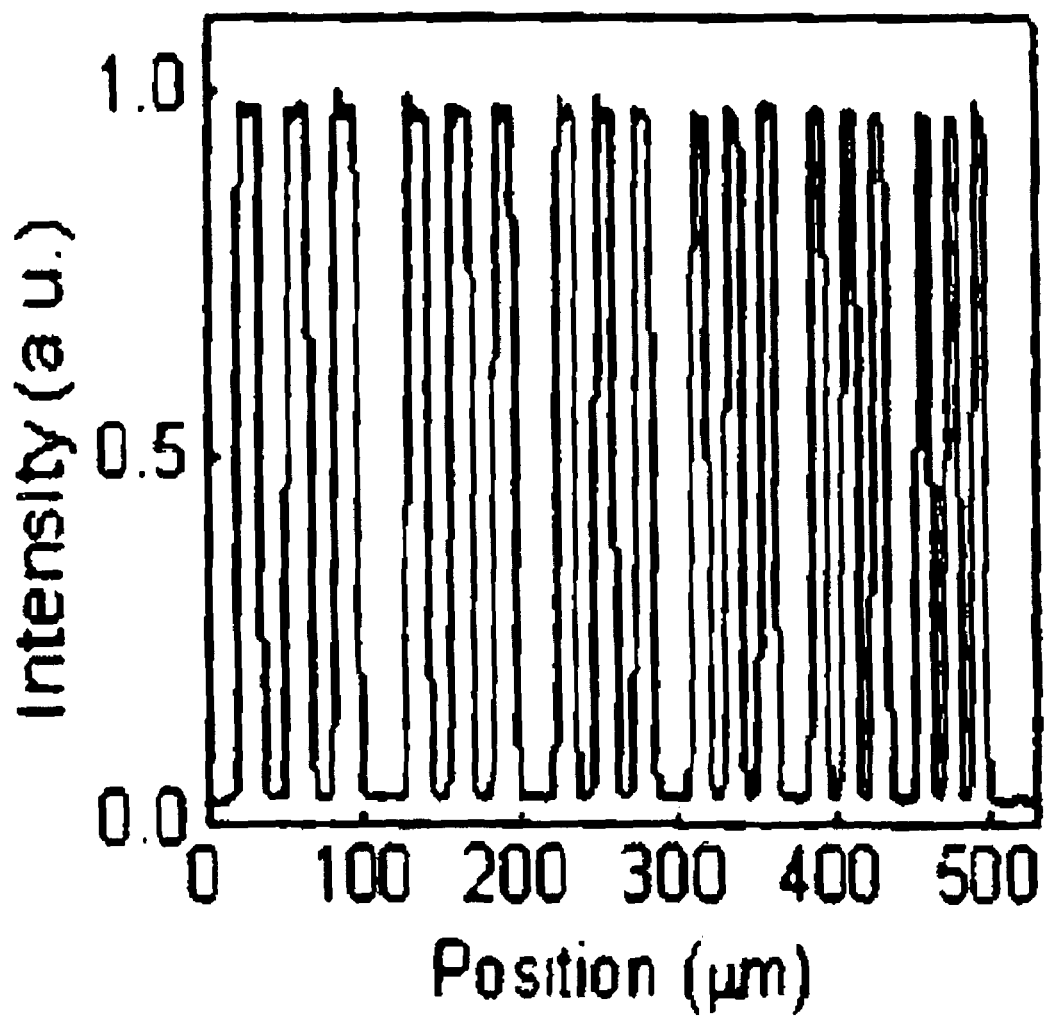
FIG. 3F is the intensity profile (whose direction is shown by the arrows) of the corresponding patterns in FIG. 3C.
Figure 3G:
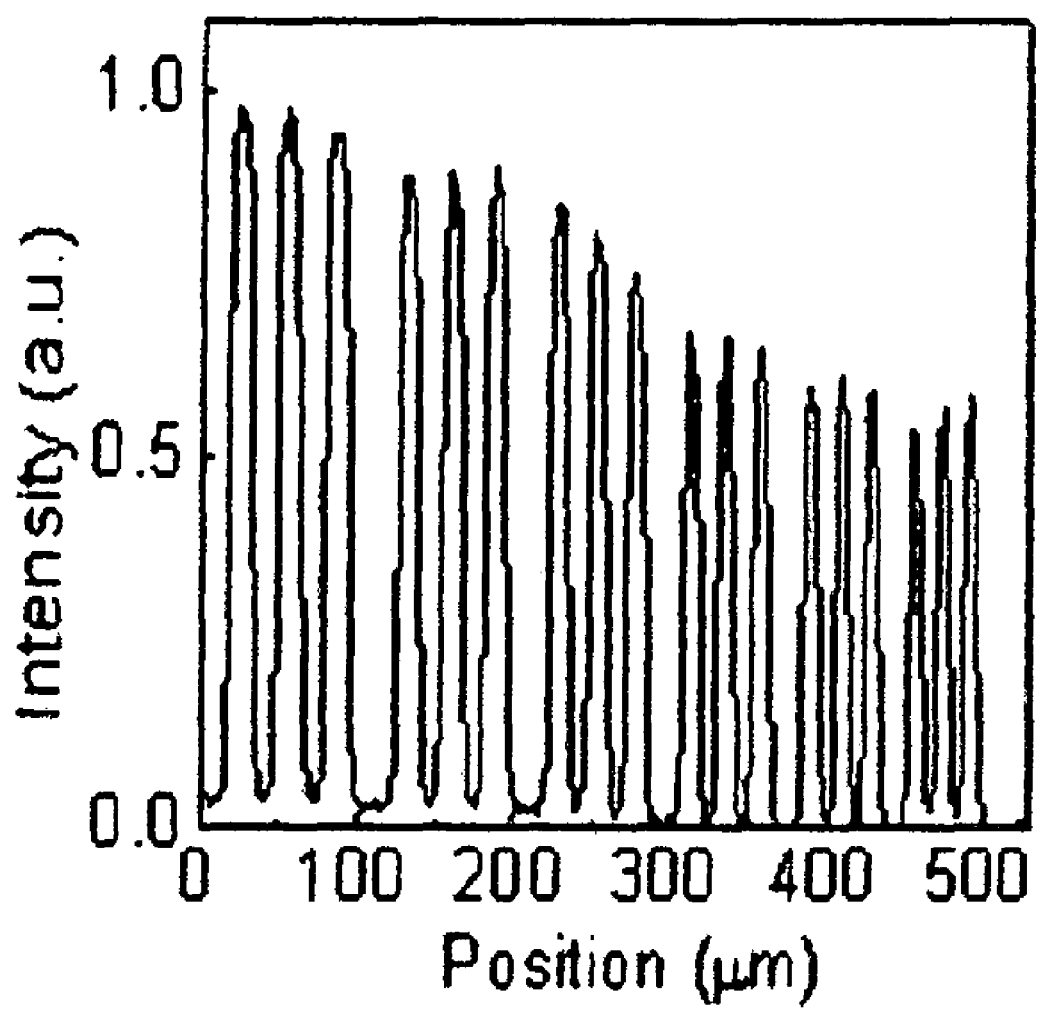
FIG. 3G is the intensity profile (whose direction is shown by the arrows) of the corresponding patterns in FIG. 3D.
Figure 3H:
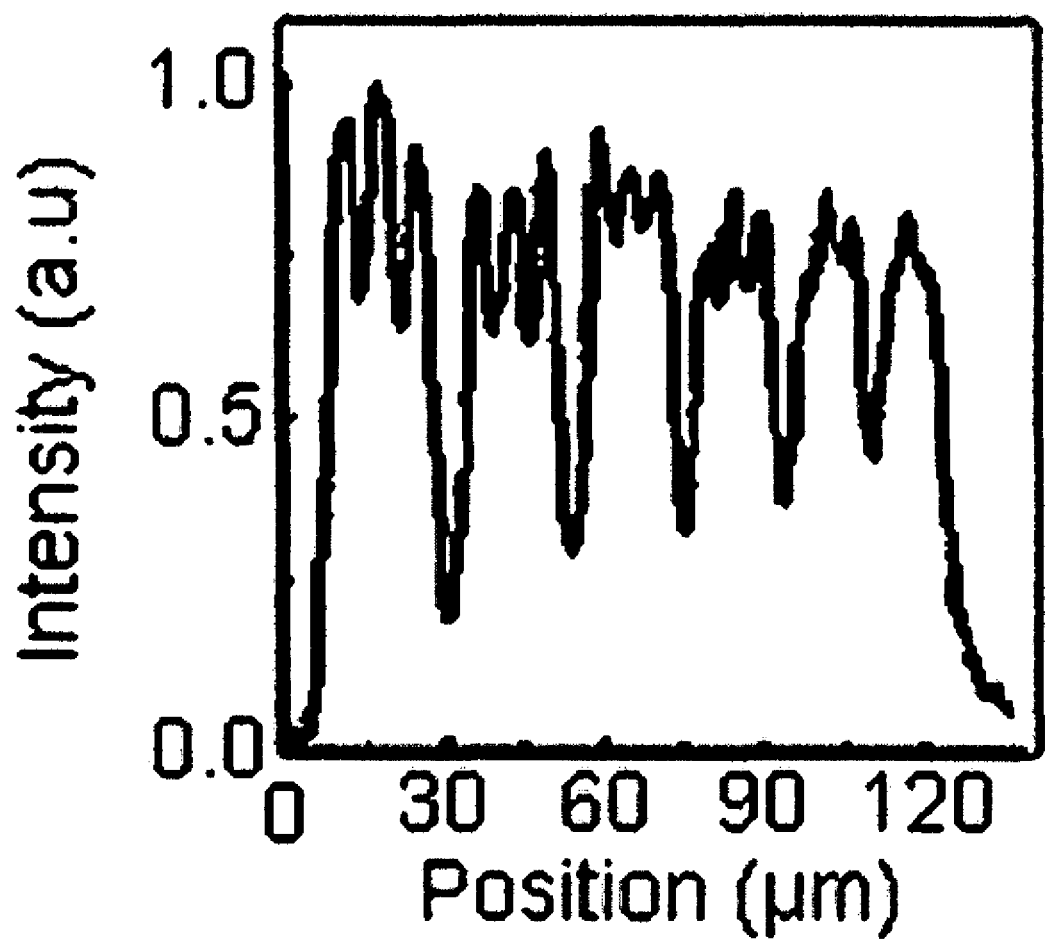
FIG. 3H is the intensity profile (whose direction is shown by the arrows) of the corresponding patterns in FIG. 3E.

FIGS. 3A, 3A', 3B and 3B' show typical brightfield images (using the 10× objective), obtained before and after single-photon recording; wherein, FIGS. 3A and 3A' are images before recording and FIGS. 3B and 3B' are images after recording. To determine the resolution of this absorbance-based single-photon readout method, intensity profiles across one specific line were obtained. FIGS. 3F and 3G show the intensity profiles of the data mask (the Air Force resolution target) and our recorded data, respectively. The size of the patterns (bar width) marked by the circles in FIGS. 3C and 3D corresponds to 7.8 μm. When using the 20× objective to read-out the same recorded data in the right-hand-side patterns in FIG. 3D, the smallest readout pattern achieved in this system was ~3.5 μm (as shown in FIGS. 3E and 3H. Results from these preliminary studies by single-photon excitation provided compelling motivation for subsequent studies using two-photon excitation.

Figure 4:
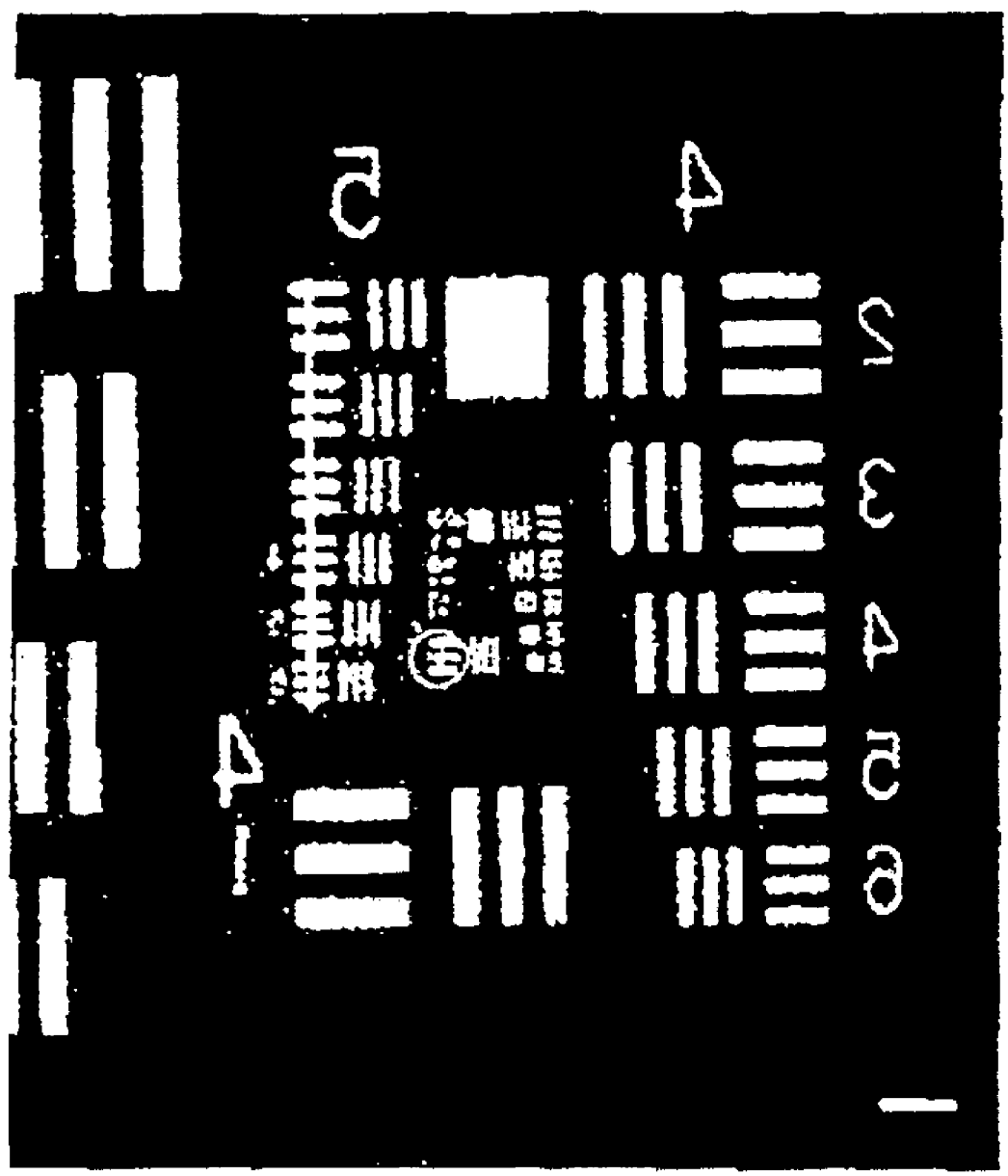
FIG. 4A shows two-photon readout of data recorded by single-photon excitation, the scale bar corresponds to 100 µm.
FIG. 4B is the intensity profile (the direction is shown by the arrows) of group 5 in FIG. 4A.
FIG. 4C is a graph of the log of input intensity dependent up-converted fluorescence of fluorene 2.
Figure 4:
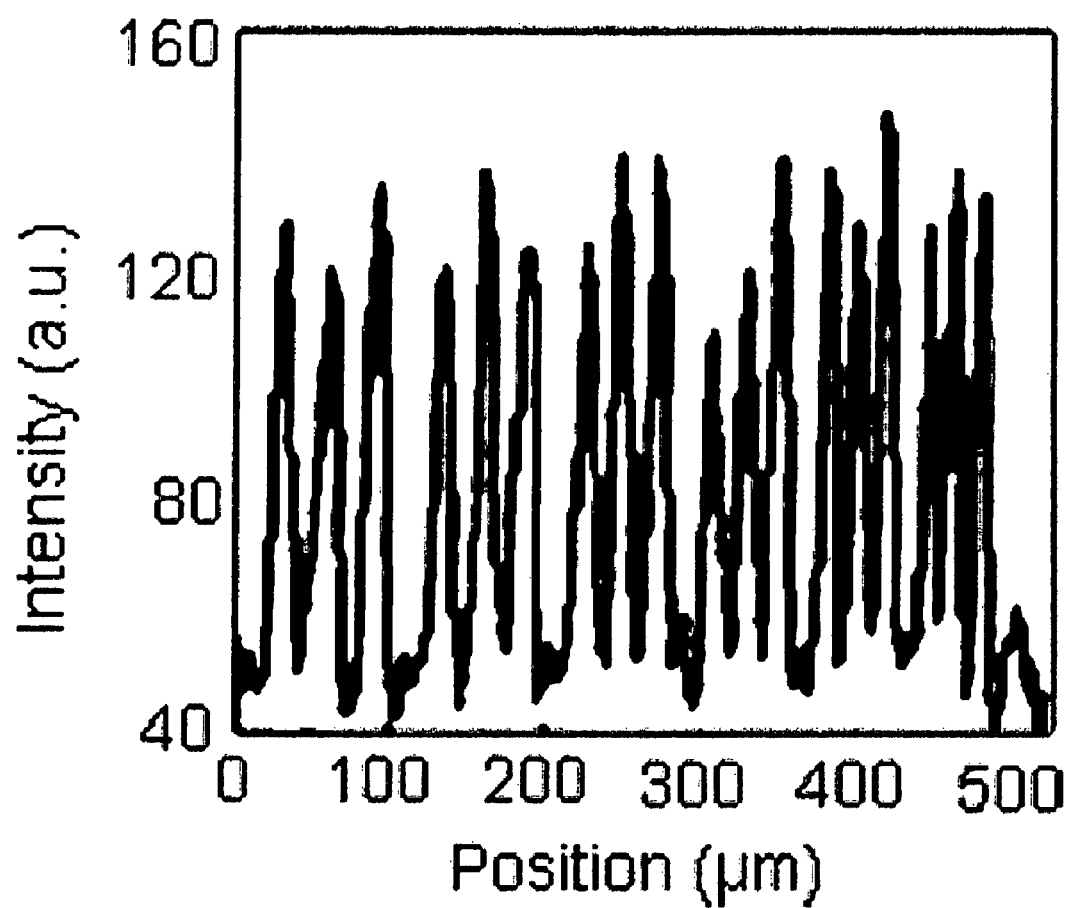
Figure 4C:
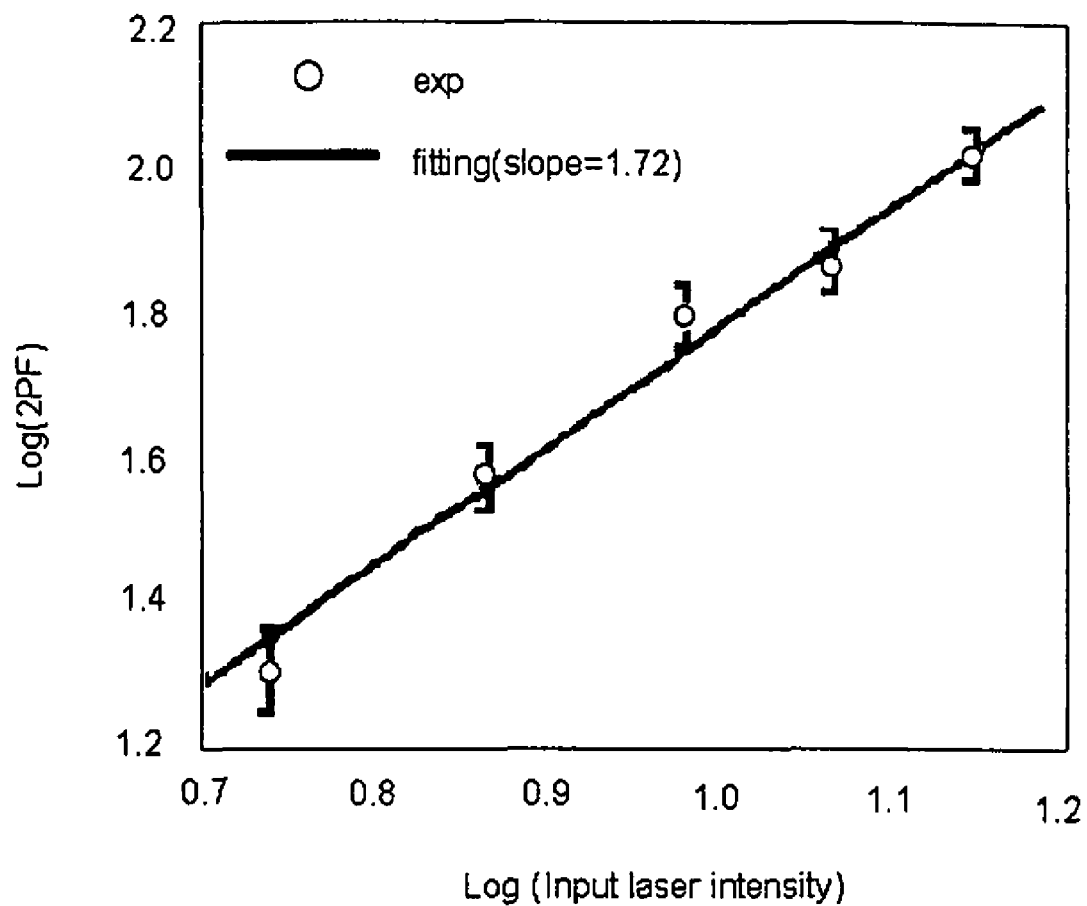

Studies using two-photon excitation are illustrated in FIGS. 4A, 4B and 4C. FIG. 4A shows two-photon readout of data recorded by single-photon excitation wherein the scale bar corresponds to 100 microns (μm). FIG. 4B is the intensity profile in the direction shown by the arrow of group 5 in FIG. 4A and FIG. 4C is a graph of the log of input intensity dependent on up-converted fluorescence of fluorene 2.

To ascertain the optimized experimental conditions for two-photon recording and readout, two-photon absorption cross-sections ($\delta_{2PA}$) of the open and closed forms of diarylethene 1 in ethyl acetate were determined by an open aperture Z-scan method, using a picosecond laser as the excitation source, as discussed by M. Shiek-Bahae et al. in *IEEE J. Quant. Electr.* Vol. 26, 760 (1990). Ethyl acetate was chosen as it has similar polarity as the host polymer. The $\delta_{2PA}$ of the open form of diarylethene 1 at 520 nm (corresponding to 260 nm of single photon excitation) was 85 GM (1 GM=1× $10^{-50}$ cm$^4$ s/photon molecule). However, Z-scan signals of the closed form at 1040 nm (corresponding to the $\lambda_{max}$ of absorption at ~517 nm) were too weak to give reliable $\delta_{2PA}$.

According to symmetry rules, the two-photon allowed transition of the closed form of diarylethene 1 (a molecule of relatively high symmetry), is expected to be located at shorter wavelengths (in the $S_0 \rightarrow S_2$ or higher transition bands) than the single-photon allowed absorption band ($S_0 \rightarrow S_1$ band). When exciting the closed form of diarylethene 1 at wavelengths shorter than 900 nm, Z-scan signals were clearly observed. The $\delta_{2PA}$ of the closed form of diarylethene 1 at 680, 750, and 800 nm was 150, 145, and 120 GM, respectively. Therefore, for the success of this two-photon read-out system (i.e., efficient readout of the two-photon up-converted fluorescence data modulated by cyclical transformations of the photochromic material), a 2PA dye need to have (1) suitable two-photon up-converted fluorescence emission overlapping the absorption spectrum of the closed form of diarylethene 1, (2) high fluorescence quantum yield at the selected readout excitation wavelength, (3) higher $\delta_{2PA}$ (greater than one order of magnitude higher than that of the closed form of diarylethene 1), and (4) high photostability to facilitate numerous readout cycles.

After taking all above requirements into consideration, fluorene 2 was selected. This 2PA dye possesses emission in a desirable wavelength range, a high two-photon up-converted fluorescence quantum yield ($\phi_f$=1.0±0.05 in hexane and 0.98±0.05 in p-THF), high two-photon absorption cross-section ($\delta_{2PA}$ of 6000 GM at 600 nm and 1185 GM at 800 nm, under femtosecond laser excitation), and high photochemical stability. Due to these characteristics, only small amounts of fluorene 2 were needed to be doped into the polymeric matrix in order to achieve high fluorescence contrast between the written and unwritten areas.

Using a modified Olympus Fluoview FV300 two-photon microscope equipped with a tunable femtosecond laser (tuned to 800 nm in this experiment), two-photon readout was convincingly demonstrated (FIGS. 4A, 4B and 4C). In particular, reading of the memory (data) in FIG. 4A is achieved by measuring the two-photon up-converted fluorescence of fluorene 2 at 800 nm as a function of position. At this wavelength, fluorene 2 has a $\delta_{2PA}$ of 1185 GM, while the $\delta_{2PA}$ of the close form of diarylethene 1 (~120 GM from picosecond Z-scan experiment) is one order of magnitude lower than that of fluorene 2. So when a weak 800 nm femtosecond laser (<10 mW) was utilized for the readout process, strong two-photon fluorescence from 2 was obtained. Meanwhile, this incident intensity is too weak to cause the closed form of diarylethene 1 to undergo significant photochemical reaction (which is related to data erasing). For future practical application of this two-photon readout system, the relatively expensive femtosecond Ti:sapphire laser can be replaced with cheaper nanosecond laser diodes ($\lambda$=785 nm) with comparable output laser intensity, as discussed by T. Shiono et al. in *Jpn. J. Appl. Phys.*, Vol. 44, 3559 (2005).

One can easily imagine binary data storage based on this system in which a fluorescence intensity threshold is set (e.g., in FIG. 4B) and anything below this intensity is a "0" and anything above this is a "1".

To further confirm that fluorene 2 underwent 2PA under these conditions, the total integrated up-converted fluorescence intensity was measured as a function of the incident intensity (pump power). Theoretically, fluorescence from a 2PA process should exhibit a quadratic dependence on incident intensity. Indeed, FIG. 4C confirms that fluorene 2 underwent two-photon absorption as evidenced by the quadratic relationship between fluorescence emission intensity at several pump powers. Particularly noteworthy is that, with this method of two-photon read-out, we were able to readout data up to 10,000 times with only small decrease in the contrast and fluorescence intensity of the original image. Consequently this readout method is practically non-destructive.

Figure 5:
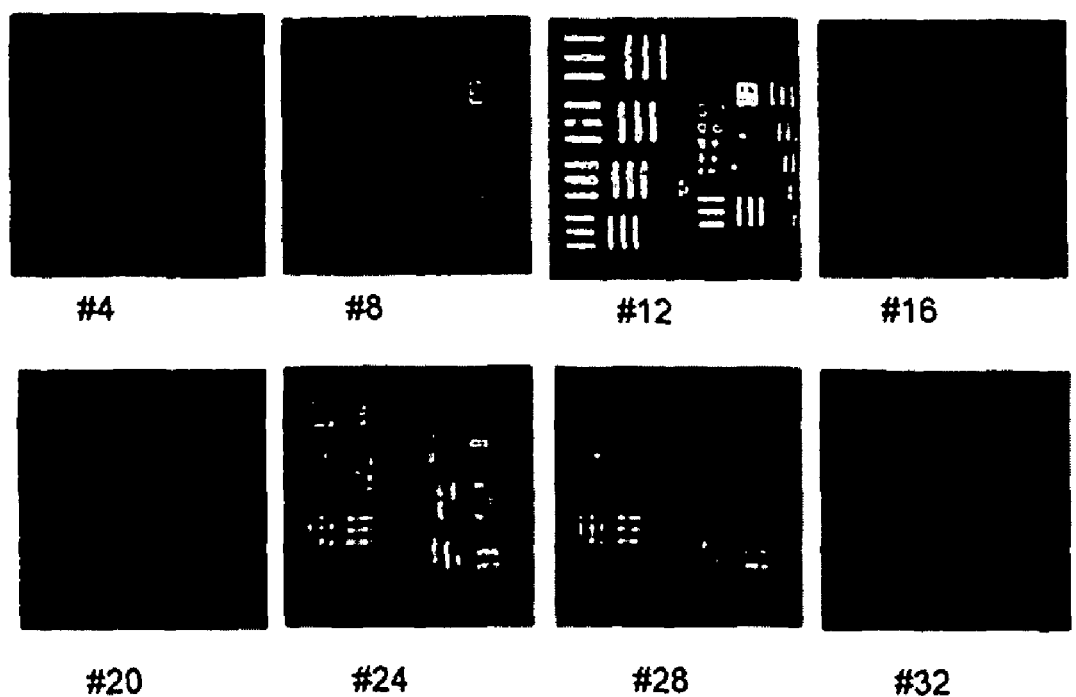
FIG. 5 shows selective two-photon readout of 38 consecutive layers. The layers are spaced at 5 µm intervals.

In FIG. 5, the ability to read multiple layers of information by the two-photon read-out method is demonstrated. A multilayer assembly was constructed by stacking two storage layers (recorded with different data using single-photon excitation) with data sides against each other. The assembly was translated in the axial (or z) direction by the computer-controlled step motor connected to the focusing knob of the microscope. 3D data from this memory stack was read by successively imaging 38 XY data planes along the axial direction with 5 µm distance between each image.

Since the $\delta_{2PA}$ of the closed form of diarylethene 1 is very small, transformation of the close form to the open form under two-photon excitation (two-photon recording) requires high excitation intensity. For demonstrating the two-photon recording ability in this photochromic system, the same equipment used in data readout systems were employed, except that the incident intensity was adjusted to a considerably high value at the focus (90 mW). A rectangular pattern (consisting of 445×345 bits) was recorded in the storage medium, by repeated scanning of the laser beam across the rectangular area for 5 min (1.2 s/scan). As the exposure time for each bit was estimated to be ~7.8 µs/scan and 250 scans were used, the total exposure time of each bit was estimated to be about 2 ms.

Figure 6A:
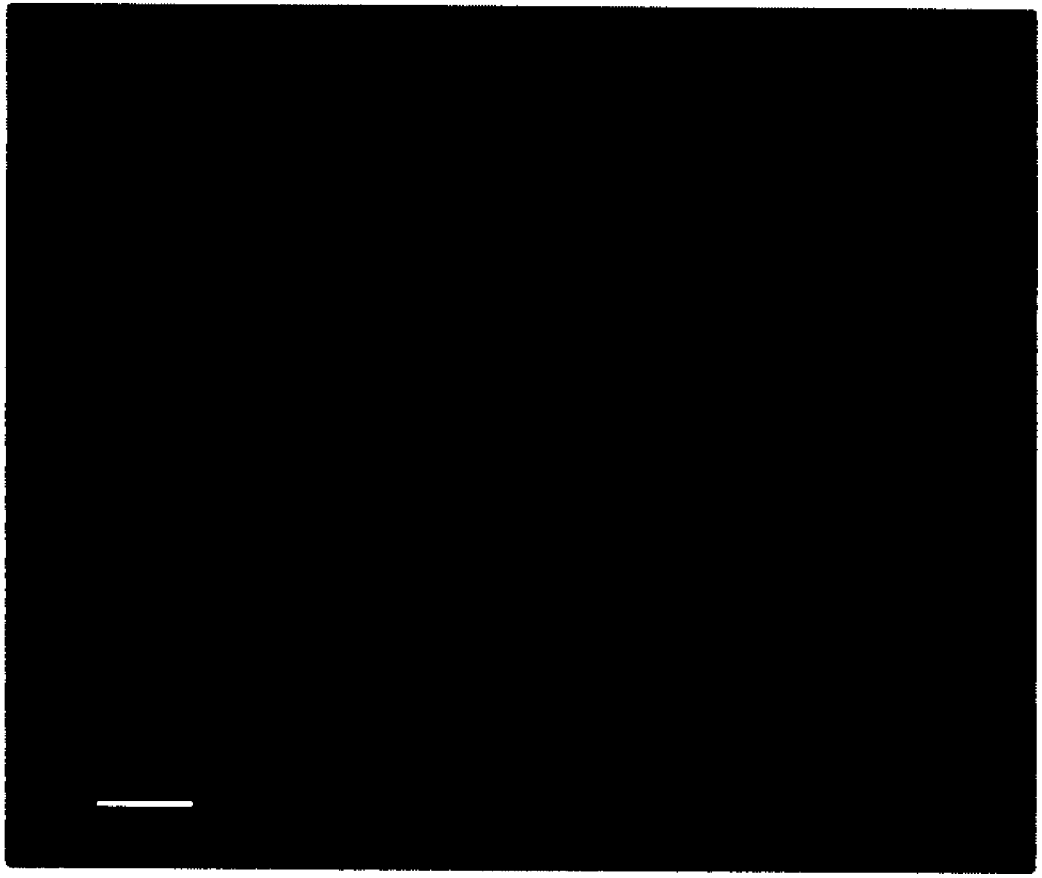
FIG. 6A is a two-photon fluorescence image of storage medium before two-photon recording.
Figure 6B:
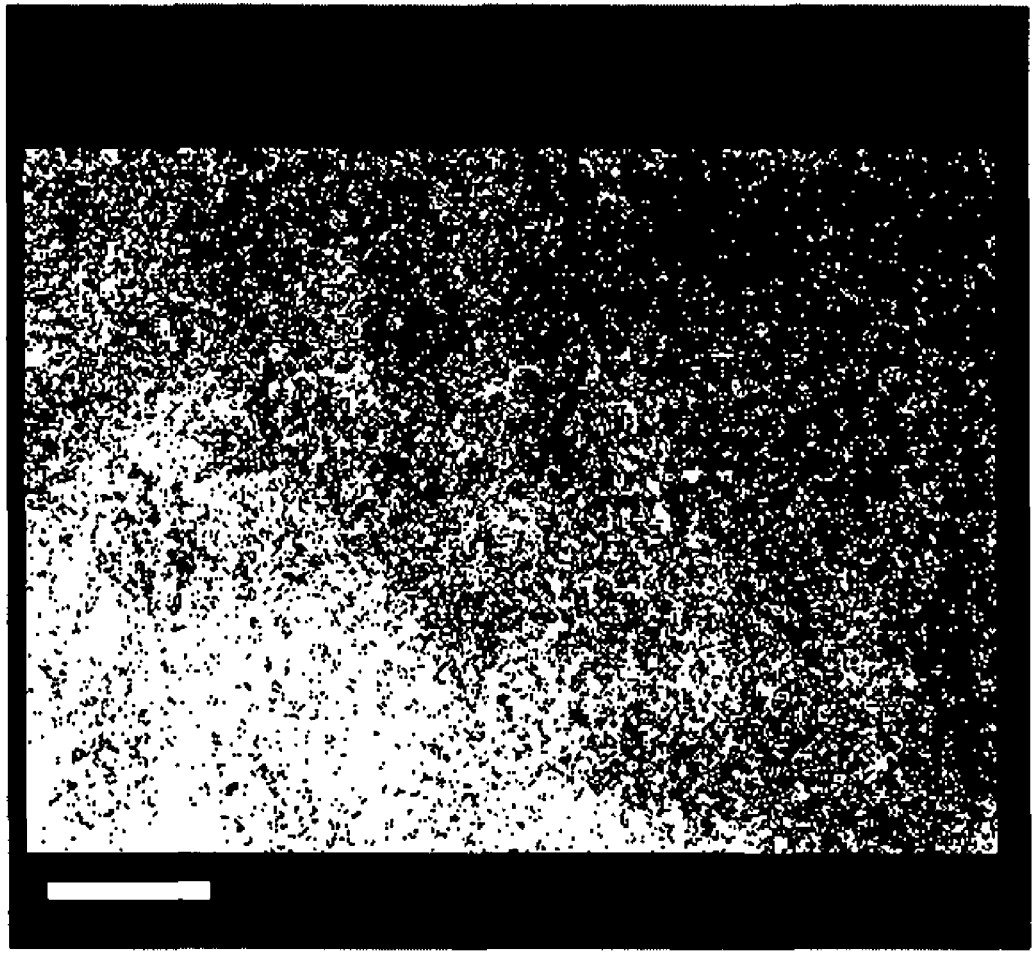
FIG. 6B is a two-photon fluorescence image of storage medium after two-photon recording.

A demonstration of the two-photon recording ability is shown in FIGS. 6A, 6B, 6C and 6D. After the two-photon recording process of the unrecorded medium in FIG. 6A, data was read by the same two-photon fluorescence microscopy method (described above) using a low incident intensity of 7 mW as shown in FIG. 6B.

Figure 6C:
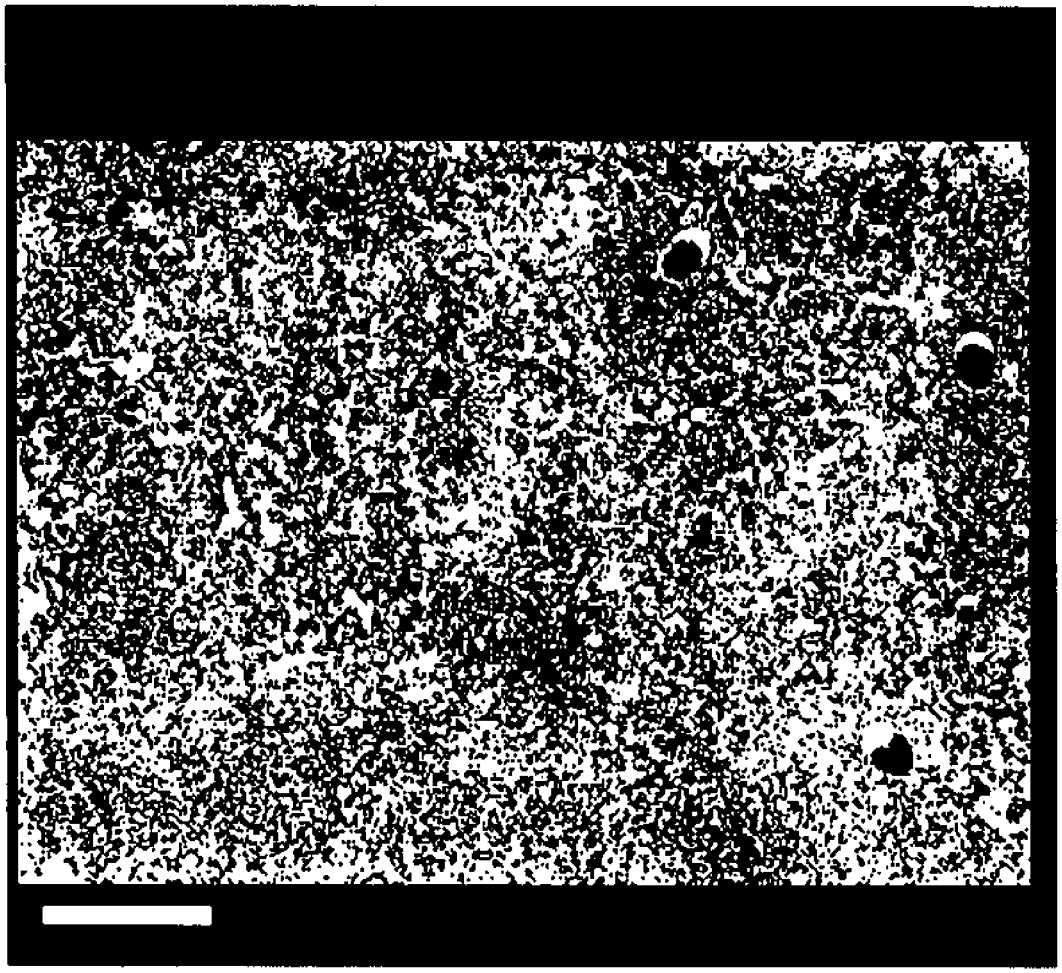
FIG. 6C is a brightfield readout of the storage data after two-photon recording.
Figure 6D:
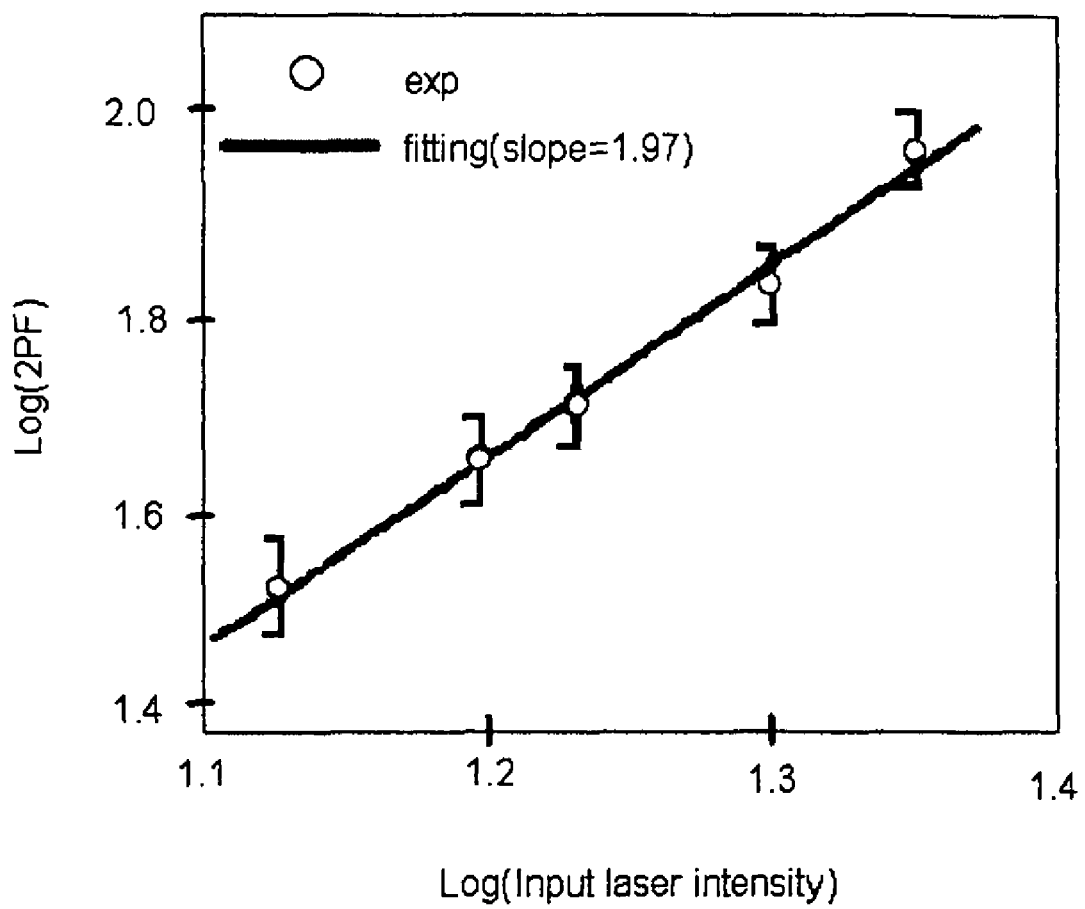
FIG. 6D is a graph of the log of input intensity dependent up-converted fluorescence of fluorene 2.
Figure 7:
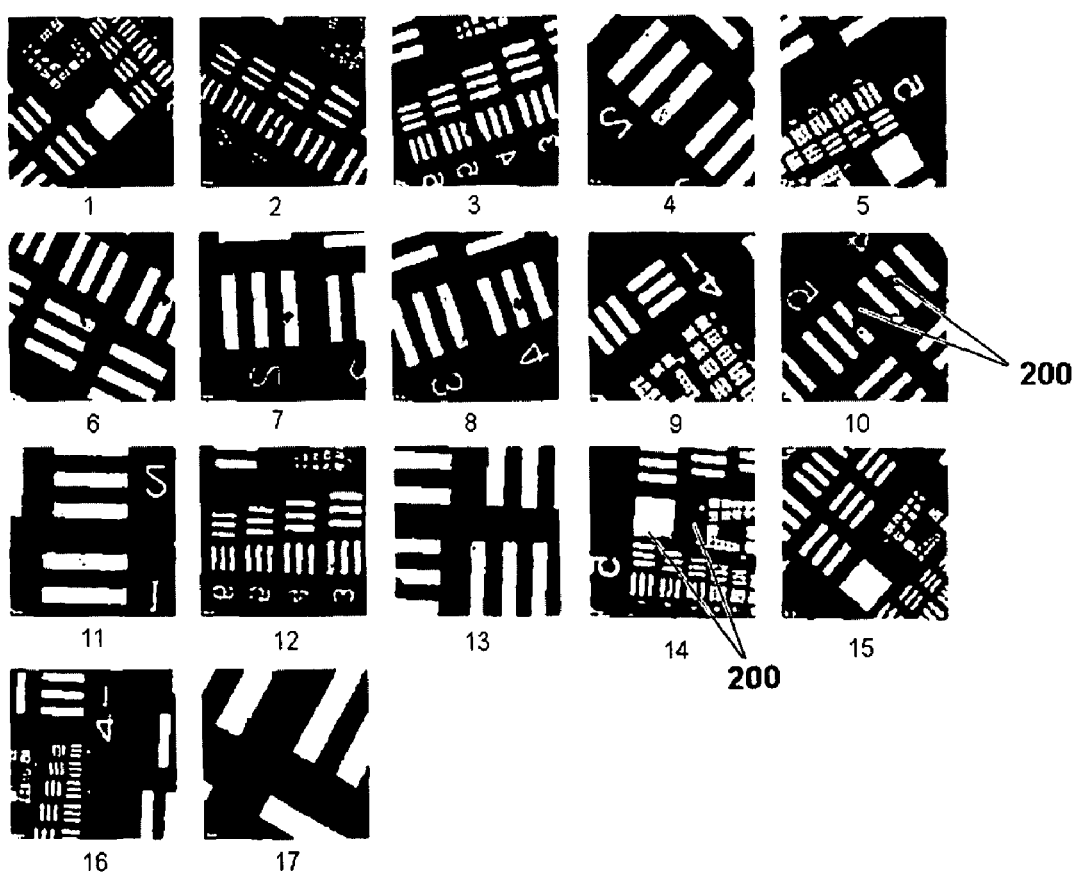
FIG. 7 is a demonstration of 17 writing, erasing, and rewriting cycles in the same area of a PMMA-co-VBP photochromic film (containing diarylethene 2 and fluorene 2) using single-photon excitation; there is an artifact in the center of the image which indicates that the recording cycles were performed in the same area of the film.

FIG. 6C is a brightfield image of the area shown in FIG. 6B. Furthermore, the quadratic relationship between fluorescence emission intensity and incident power provides strong evidence that the data readout in FIG. 6B is, indeed, a result of two-photon induced fluorescence according to the log of the input laser intensity shown in FIG. 6D, further confirming that the closed form of diarylethene 1 can transform to open form by two-photon excitation when excited by IR laser with high incident intensity for data recording but essentially remains unchanged upon two-photon readout of the 2PA dye.

It is interesting to learn that, when the incident intensity of the two-photon recording process was reduced to 45 mW, the total exposure time for each bit should increase to ~8 ms (4 times greater than that under 90 mW excitation) to generate data with comparable contrast as that under 90 mW excitation. This finding is consistent with the quadratic dependence to two-photon absorption on the incident light intensity. Thus, it can be estimated that, if the incident intensity was further reduced to 7 mW, the exposure time for each bit would increase to ~330 ms. On the other hand, this estimation means that if a rectangular area (stored data, consisting of 512×512 bits) were readout under 7 mW incident intensity with a scan speed of 1.2 s/scan (which is the typical speed used in the two-photon readout), the exposure time for each bit was estimated to be ~4.6 μs/scan. Up to 7.2×10$^4$ readout cycles (scans) are, in principle, required before the total exposure time of each bit reaches 330 ms, which is related to significant erasure of the data points. In fact, in experimental conditions, it has been demonstrated that up to 10,000 readout cycles caused a negligibly small decrease in the contrast and fluorescence intensity of the original image, which is consistent with results reported above.

Writing, erasing and rewriting capability on a polymer film containing the photostationary state of diarylethene 2 was demonstrated in FIGS. 7 through 17 recording, read-out and erasing cycles, clearly demonstrating the erasable/rewritable characteristics of this material and process. Centrally located in each of the 17 images is an artifact 200 that provides confirmation that the recording cycles were performed in the same area of the film.

Figure 8:
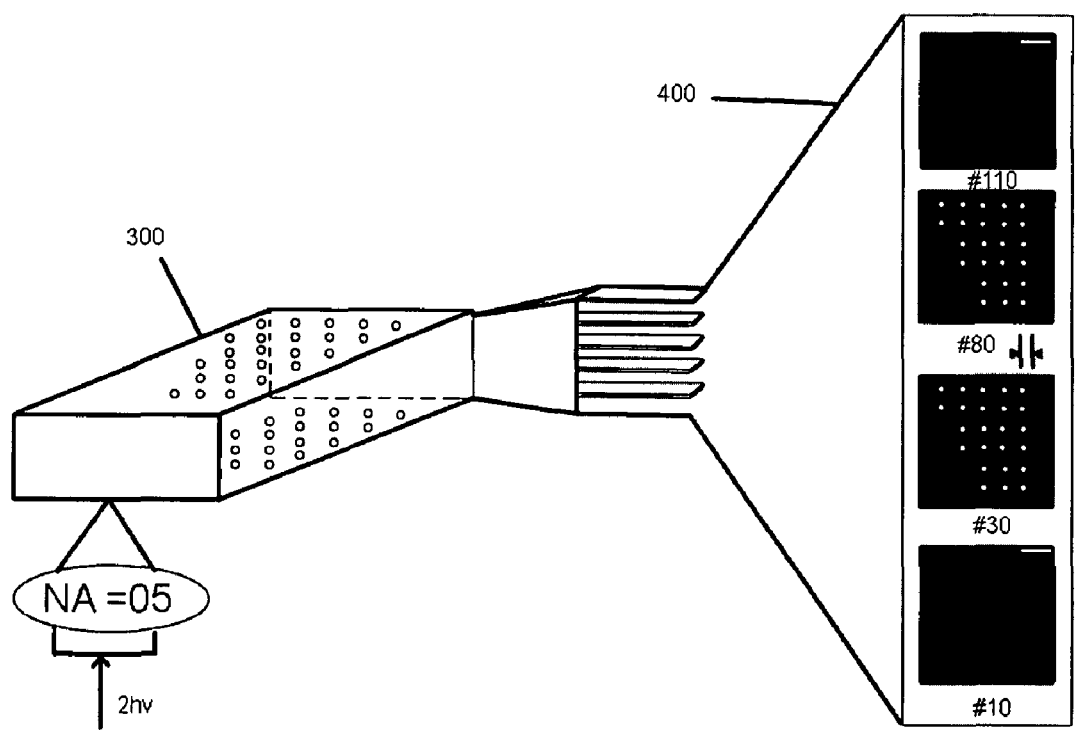
FIG. 8 shows a two-photon readout of 110 consecutive layers (1 µm layer interval) inside the polymer film. Two layers (images #30 and #80) were recorded by two-photon exictation.

The two-photon 3D recording ability in our system is demonstrated in FIG. 8, by recording two layers of bits on thick polymer films (~120 μm). Films were prepared by casting solutions of PMMA-co-VBP containing the closed form of diarylethene 1 and fluorene 2 on glass slides (by using a PI-1210 film coater from Tester Sangyo Co. Ltd.).

After coating, films were stored in the dark to avoid any external irradiation exposure. Two layers of bits separated by 50 μm in the Z direction (depth) were written in the volume of the polymer film by two-photon excitation. For this bit-by-bit experiment, the same Olympus Fluoview FV300 previously described was used for data recording and data readout. The excitation beam was generated by a mode-locked Ti:Sapphire laser, tuned to 800 nm, (Δλ=8 nm, 150 fs pulse width, 76 MHz repetition rate). The laser beam was focused on to the sample using a 20× objective lens.

For two-photon recording, the average beam power (360 mW) was attenuated such that the maximum power measured at the sample was 20 mW. For two-photon read-out, the same Ti:sapphire laser was used with a lower average power of 6 mW. High power excitation at the sample was not required due to the increased two-photon photosensitivity afforded by the fluorene derivative. An efficient data writing system was developed by using a motorized MAXY X-Y stage and BSC102 controller, SH05 electronic beam shutter, and SC10 controller (Thorlabs).

Recording in the first layer was achieved by using different exposure times: 200 ms (for the first two lines to the top), 500 ms (for the next two lines in the middle) and 1 s (for the two lines on the bottom). The distance between neighboring bits inside one layer was 50 μm. Recording in the second layer was achieved by moving the XY stage 25 μm to the left (offset relative to the first layer) and using the same exposure times and pattern as the first layer.

FIG. 8 shows representative images of the readout of 110 consecutive layers (1 μm layer interval) inside the polymer film. The bulk film 300 is illustrated on the left while actual data layers 400 are shown on the right. The distance between layers was 50 microns (μm) and the distance between neighboring bits in each layer was 50 μm. Bits in each layer were recorded at several exposure times: t=200 ms (for the two top lines), 500 ms (for the next two middle lines) and 1 s (for the two bottom lines). Recording in the second layer was achieved by moving the XY stage 25 μm to the left (offset relative to the first layer, depicted by the parallel lines between layers #30 and #80 in the figure). The scale bar corresponds to 50 μm and the actual read out was observed at 5 μm intervals. The schematic image in FIG. 8 shows how the data layers 400 are selectively recorded; there is no recording in layers #10 and #110, while information is recorded in two layers only, namely, #30 and #80.

EXPERIMENTAL 1,2-Bis(2-methylbenzo[b]thiophen-3-yl)hexafluorocyclopentene (diarylethene 1) was purchased from TCI America and used without further purification. 2,7-Bis[4-(9,9-didecylfluoren-2-yl)vinyl]phenyl benzothiazole (fluorene 2) was synthesized and characterized as previously described and reported by Belfield et al. in *Chem. Mater.* Vol. 16, 4634 (2004). Spectroscopic grade hexane (Alfa Aesar), THF, and ethyl acetate (Acros) were used as solvents. Preparation of poly[methylmethacrylate-co-(diethyl vinyl benzyl phosphonate)] was as described by Belfield et al. in *J. Polym. Sci. Polym. Chem.* Vol. 33, 1235 (1995). Absorption spectra were recorded with an UV-visible Agilent 8453 spectrophotometer. The steady-state fluorescence spectra were measured with a PTI Quantamaster spectrofluorimeter in the photon-counting regime of the PMT. Quantum yields of the cyclyzation $QY_\alpha$ and cycloreversion $QY_\alpha$ photochromic reactions were determined by an absorption method reported by K. D. Belfield, et al. in *J. Photochem. Photobiol. A: Chem.* Vol. 162, 569 (2004).

The polymer films for the two-dimensional recordings were prepared using solutions of 1 wt % poly[methyl methacrylate-co-(diethyl vinyl benzyl phosphonate)] in acetonitrile, into which diarylethene 1 (22 wt % relative to the polymer) and fluorene 2 (1 wt % relative to the polymer) were added. The polymeric solution was sonicated, filtered through a 0.2 μm pore size filter, then purged with $N_2$ for 10 min followed by ultrasonic degassing. This solution was irradiated with a Rayonet photoreactor at 254 nm (~3 mW/cm$^2$), until the photostationary state of diarylethene 1 was reached (determined by monitoring the UV-visible absorption spectrum). A deep red solution was obtained before coating. Solution casting films of approx. 40 μm was accomplished on glass slides by using a PI-1210 film coater from Tester Sangyo Co. Ltd. After coating, films were stored in the dark to avoid any external irradiation exposure.

The 2PA cross-sections of the O-form and C-form of diarylethene 1 were measured by a open-aperture Z-scan method as disclosed by M. Sheik-Bahae, et al. in *IEEE J. Quant. Electr.*, supra with picosecond Nd:YAG laser (PL 2143 B Ekspla) coupled to an optical parametric generator (OPG 401/SH) with pulse duration ≈25 ps (FWHM), operating at a 10 Hz repetition rate.

An inverted microscope (Olympus IX81) equipped with a Hamamatsu EM-CCD (Model C9100-02) was used for single-photon recording/readout. Two-photon recording/readout were performed on a modified Olympus Fluoview FV300 two-photon microscopy system equipped with a tunable Coherent Mira 900 Ti:Sapphire laser (tuned to 800 nm, 175 fs pulse width, 76 MHz repetition rate). A Hamamatsu photomultiplier tubes was used as the detector. A band-pass filter (510 nm-550 nm) was placed in front of the detector.

The present invention provides an optical data storage system with non-destructive multiple readout of 3D data stored in multiple layers by using two-photon induced fluorescence modulation as the readout system in a photochromic polymer. Such a system is not only possible but can be done for >10,000 readout cycles without significantly compromising the stored data. In contrast to prior art writing/reading systems, in which the read and write wavelengths are well-separated; the system of the present invention can be recorded and read out using the same wavelength simply by changing the intensities. As the incident intensity used in two-photon readout is low due to the efficient 2PA dye, it is also possible to replace the Ti:Sapphire femtosecond laser with other less expensive lasers. For example, a nanosecond laser diode with comparable peak intensity can be used, making this two-photon 3D data storage system feasible for high data storage volume, less expensive, stable, highly responsive, and reliable.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A three-dimensional (3-D) WORM (Write Once Read Many) or erasable and rewritable optical data storage device with non-destructive, multiple readout of 3-D data stored in multiple layers consisting essentially of:
   (a) a disk structure suitable for structurally supporting a storage medium in multiple layers;
   (b) said storage medium containing a combination of an isomeric photochrome selected from at least one of 1,2-bis(2-methylbenzo[b]thiophen-3-yl) hexafluorocyclopentene open form (diarylethene 1-open) and 1,2-bis(2-methylbenzo[b]thiophen-3-yl) hexafluorocyclopentene photostationary state (diarylethene 1-closed) and a two-photon fluorescent dye wherein the emission spectrum of the fluorescent dye overlaps the absorption spectrum of one of the isomers of the photochrome;
   (c) a recording system consisting of a single laser adapted to provide an incident recording intensity above and an incident readout intensity below a threshold for data recording by the combination of the two-photon fluorescent dye and isomeric photochrome; and
   (d) the recording system in combination with said storage medium supported by said disk structure operates as a Fluorescence Resonance Energy Transfer (FRET) based optical data storage system wherein the recording system records data in the storage medium at a wavelength within a range between approximately 500-900 nm and with the incident recording intensity of approximately 90 mW/cm$^2$ and modulation of the two-photon fluorescent dye by the photochrome results in a non-destructive readout of data from the optical data storage device at the wavelength with the incident readout intensity of approximately 7 mW/cm$^2$.

2. The WORM or erasable and rewritable optical data storage device according to claim 1 wherein said storage medium is a thin film polymer.

3. The WORM or erasable and rewritable optical data storage device according to claim 1 wherein the two-photon fluorescent dye is (2,7-bis[4-(9,9-didecylfluoren-2-yl)vinyl] phenylbenzothiazole (fluorene derivative 2).

4. The WORM or erasable and rewritable optical data storage device according to claim 1 wherein the storage medium circumvents the erasing of data during the read out of stored optical data by irradiating the photochrome for writing after converting a large portion of the short wavelength diarylethene 1-open to the longer wavelength diarylethene 1-closed.

5. A three-dimensional (3-D) WORM (Write Once Read Many) or erasable and rewritable optical data storage device consisting essentially of:
   (a) a disk structure suitable for structurally supporting a polymer film;
   (b) said polymer film containing a combination of an isomeric photochrome selected from at least one of 1,2-bis(2-methylbenzo[b]thiophen-3-yl)hexafluorocyclopentene open form (diarylethene 1-open) and 1,2-bis(2-methylbenzo[b]thiophen-3-yl)hexafluorocyclopentene photostationary state (diarylethene 1-closed) and a two-photon fluorescent dye wherein the emission spectrum of the fluorescent dye overlaps the absorption spectrum of one of the isomers of the photochrome;
   (c) a recording system consisting of a single laser adapted to provide an incident recording intensity above and an incident readout intensity below a threshold for data recording by the two-photon fluorescent dye and isomeric photochrome combination of (b); and
   (d) the recording medium in combination with said polymer film is irradiated to allow multiple layer recording and readout at the same wavelength by said disk structure whereby data recording in the polymer film occurs at a wavelength within a range between approximately 500-900 nm and with the incident recording intensity of approximately 90 mW/cm$^2$ and the resulting stored optical information is recovered via multichannel readout at by irradiation with the wavelength with the incident readout intensity of approximately 7 mW/cm$^2$.

6. The WORM or erasable and rewritable optical data storage device according to claim 5 wherein the two-photon fluorescent dye is (2,7-bis[4-(9,9-didecylfluoren-2-yl)vinyl] phenylbenzothiazole (fluorene derivative 2).

7. The WORM or erasable and rewritable optical data storage device according to claim 5 wherein the polymer film is irradiated with near-infrared (IR), two-photon excitation that allows multiple layer recording from approximately 5 up to approximately 1000 layers with at most 5 micron thick layers of data recorded with 5 micron layers spacing per layer to prevent crosstalk.

8. A method of storing and reading three-dimensional (3-D) Write Once Read Many (WORM) or erasable and rewritable optical data using the same wavelength within a photochromic polymer composition using two-photon excitation, comprising the steps of:
   (a) selecting a thin film polymer material;
   (b) forming a photochromic polymer composition by doping the thin film polymer material with a combination of an isomeric photochrome selected from at least one of 1,2-bis(2-methylbenzo[b]thiophen-3-yl)hexafluorocyclopentene open form (diarylethene 1-open) and 1,2-bis(2-methylbenzo[b]thiophen-3-yl)hexafluorocyclopentene photostationary state (diarylethene 1-closed) and a two-photon absorbing fluorescent dye wherein the emission spectrum of the fluorescent dye overlaps the absorption spectrum of one of the isomers of the photochrome;
   (c) forming said composition into at least a three dimensional layer structure; and,
   (d) inducing storage in said layer with near infra-read laser generation wherein the data recording occurs at a wavelength within a range between approximately 500-900 nm and with an incident recording intensity of approximately 90 mW/cm$^2$; and
   (e) enabling non-destructive multiple read out by using fluorescence resonance energy transfer (FRET) in the photochromic polymer using two-photon excitation whereby the data readout occurs at the wavelength with the incident readout intensity of approximately 7 mW/cm$^2$.

9. The method according to claim 8 wherein said three dimensional structure layer is made of poly[methylmethacrylate-co-(diethylvinylbenzyl-phosphonate) [PMMA-co-VBP].

10. The method according to claim 8 wherein the two-photon fluorescent dye is (2,7-bis[4-(9,9-didecylfluoren-2-yl)vinyl]phenylbenzothiazole (fluorene derivative 2).

11. The method according to claim 8 further including a means for circumventing the erasing of data during the read out of stored optical data.

12. The method according to claim 11 wherein the means for circumventing the erasing of data includes irradiating the photochrome for writing after converting a large portion of the short wavelength diarylethene 1-open to the longer wavelength diarylethene 1-closed.

13. A three-dimensional (3-D) WORM (Write Once Read Many) or erasable and rewritable optical data storage system with storage and non-destructive, multiple readout of 3-D data stored in multiple layers using the same light wavelength for storage and readout, consisting essentially of:
   (a) a disk structure composed of approximately 5 micron thick layers for data recording and approximately 5 micron thick layers spacing per layer to prevent crosstalk and suitable for structurally supporting a storage medium;
   (b) said storage medium containing a combination of an isomeric photochrome selected from at least one of 1,2-bis(2-methylbenzo[b]thiophen-3-yl)hexafluorocyclopentene open form (diarylethene 1-open) and 1,2-bis(2-methylbenzo[b]thiophen-3-yl)hexafluorocyclopentene photostationary state (diarylethene 1-closed) and a two-photon fluorescent dye wherein the emission spectrum of the fluorescent dye overlaps the absorption spectrum of one of the isomers of the photochrome;
   (c) a recording system consisting of a single laser adapted to provide an incident recording intensity above and an incident readout intensity below a threshold for data recording by the two-photon fluorescent dye and isomeric photochrome combination of (b); and
   (d) the recording system in combination with said storage medium supported by said disk structure operates as a non-destructive readout optical storage system wherein data is recorded and read out using the same wavelength, the data recording occurs at a wavelength of approximately 800 nm with the incident recording intensity of approximately 90 mW/cm$^2$ and the data readout occurs at said wavelength with the incident readout intensity of approximately 7 mW/cm$^2$.

14. The system according to claim 13 wherein the two-photon fluorescent dye is (2,7-bis[4-(9,9-didecylfluoren-2-yl)vinyl]phenylbenzothiazole (fluorene derivative 2).

* * * * *